United States Patent [19]

Gomi et al.

[11] 4,113,716

[45] Sep. 12, 1978

[54] PROCESS FOR PREPARING IMPROVED SOY PROTEIN MATERIALS

[75] Inventors: Teruo Gomi, Yokohama; Yuji Hisa; Takahiko Soeda, both of Kawasaki, all of Japan

[73] Assignee: Ajinomoto Co., Inc., Tokyo, Japan

[21] Appl. No.: 790,440

[22] Filed: Apr. 25, 1977

[30] Foreign Application Priority Data

Apr. 27, 1976 [JP] Japan .................... 51-48262

[51] Int. Cl.² ........................... A23J 1/14; A23L 1/20
[52] U.S. Cl. ................... 260/123.5; 426/634; 426/656; 426/507
[58] Field of Search ............... 426/634, 656, 430, 508, 426/479, 507; 260/112 R, 123.5

[56] References Cited

U.S. PATENT DOCUMENTS

| 3,126,286 | 3/1964 | Moshy | 426/634 |
| 3,155,524 | 11/1964 | Norris et al. | 426/634 |
| 3,361,575 | 1/1968 | Paulsen | 426/634 |

Primary Examiner—Robert A. Yoncoskie
Attorney, Agent, or Firm—Oblon, Fisher, Spivak, McClelland & Maier

[57] ABSTRACT

A process particularly designed to further improve soy protein previously denatured by superheating treatment or alcohol extraction comprises heating an aqueous slurry of the denatured, defatted soybean flake material under prescribed conditions. Nitrogen values, flavor and color are improved.

11 Claims, No Drawings

PROCESS FOR PREPARING IMPROVED SOY PROTEIN MATERIALS

BACKGROUND OF THE INVENTION

1. Field of the Invention

This invention relates to a process for preparing improved soy protein materials from denatured soy protein, and more particularly to a process for preparing improved soy protein materials from soy protein denatured by superheating treatment or alcohol extraction.

2. Description of the Prior Art

Heretofore, soy protein materials such as extracted and isolated soy proteins have been prepared from defatted soybean flake material having a high NSI (Nitrogen Solubility Index) of not less than 85%, which are usually obtained in high yields by desolventizing solvent-extracted soybean meal or flakes at a low temperature. The basic process for producing extracted soy protein comprises dispersing defatted soybean flake material having a high NSI in water at a weight ratio of flake material to water of between 1 to 5 and 1 to 15, extracting water-soluble materials from the flakes at pH 6.5 to 9.0, and separating insoluble materials from the resulting extract solution, and further comprises the steps of concentration, sterilizing and spray-drying, if necessary. Isolated protein has been prepared by adding an acid to lower the pH of the above-mentioned extract solution to about the isoelectric point of the protein, which is between about 4 and 5, collecting the precipitated protein and discarding the whey or excess liquor, and neutralizing the collected protein, and further comprises steps of concentration, sterilizing and spray-drying, if necessary. In accordance with the above processes, the yields of the extracted and isolated protein are usually 60 to 65% and 30 to 35%, respectively.

Although superheating treatment and alcohol extraction give excellent properties to defatted soybeans, the solubility of the protein therein is unavoidably decreased to an NSI of 15 to 70%. Therefore, even if the above known processes are applied to such defatted soybeans denatured by superheating treatment or alcohol extraction, the yields of the extracted and isolated proteins are decreased to less than 50% and less than 20% respectively, making of such processes unattractive industrialization.

SUMMARY OF THE INVENTION

The present inventors have found that the NSI of such denatured defatted soybean flake material is recovered by subjecting an aqueous slurry of the same to an elevated temperature for a short period. According to the process of this invention, soy protein materials such as extracted and isolated soy proteins are produced from the denatured defatted soybeans in almost the same yields as those achieved by using undenatured defatted soybean flakes having a high NSI as starting materials. Furthermore, the present invention provides soy protein materials having properties which cannot be obtained, or are superior to properties so obtained by using undenatured defatted soybean flakes as starting materials.

DETAILED DESCRIPTION OF THE PREFERRED EMBODIMENT

The soybeans forming the starting material are ground or crushed, and the oil is extracted with solvents such as hexane to leave soybean meal or flakes, which are desolventized in a device commonly known as a Desolventizer Toaster. During this operation, the meal or flakes are superheated in the presence of steam, and enzymes therein such as lipoxygenase and urease are inactivated. However, the solubility of soy protein therein is decreased to an NSI of 15 to 60%. Such defatted soybean flake material denatured by superheating in various manners is used as one of the starting materials.

Defatted soybean flake material denatured by alcohol extraction can also be used as a starting material, and is usually prepared in the following manner.

When undenatured defatted soybean flake material is contacted with alcohols such as ethanol, propanol, or a mixture of hexane and alcohol at a temperature between room temperature and the boiling point of the solvent, yellow coloring matter, together with the characteristic "beany" flavor and objectionable bitter taste of soybeans are largely removed. However, at the same time, the solubility of the protein is decreased as it is in superheating treatment. The extent of denaturation by alcohol extraction depends largely upon the extraction temperature and the water content in the solvent. The higher the extraction temperature the more extensive is the denaturation. When using an aqueous alcohol as solvent, the maximum denaturation occurs at a water content of about 30%. Although the decrease of the NSI can be reduced by increasing the water content, the removal of alcohol-soluble matter (bitter substances) such as saponins, oily substances, aldehydes and ketones is also suppressed thereby. Therefore, the use of anhydrous alcohol is preferable in view of both the decrease of the NSI and the removal of alcohol-soluble materials. However, the influence of anhydrous alcohol on the NSI is also correlative with the extraction temperature. The optimum conditions of alcohol extraction may be readily determined by experiments, the above-mentioned factors being considered. There is yielded defatted soybean flake material, denatured by alcohol, which has an NSI of not more than 70% and usually not less than 15%.

In accordance with the process of this invention, the NSI of such denatured soybean flake material is recovered. More specifically, the denatured soybean flake material is disposed in water at a weight ratio of flake material to water of between 1 to 5 and 1 to 15, and the resulting slurry is adjusted to pH 6.5 to 9.0 with an alkali such as sodium hydroxide. Soluble materials mainly consisting of proteins and sugars are extracted from the flake material by allowing the slurry to stand, preferably with stirring, for more than 5 minutes.

This extraction procedure is not essential, but is effective for carrying out the treatment of this invention efficiently. The particular amount of water is not critical, although it has influence upon the efficiencies of the next heat treatment of this invention, and of the separation of insoluble materials from the treated slurry and the concentration of the treated slurry, which are made if desired. The more preferred weight ratio of the flake material to water is between 1 to 7 and 1 to 12.

The pH of the slurry during the extraction is more important. The extraction can be carried out in a weak acid pH range as described hereinbefore, but an alkaline pH range, especially a pH of 7 to 8, is preferable in view of both the extraction time and the effect and efficiency of the subsequent heat treatment of this invention. The NSI of protein in the resulting slurry is greatly increased by heating, preferably very rapidly heating the same to a temperature of about 110° – 140° C, subsequently retaining the slurry at a temperature in the above range for 2 seconds to 3 minutes. The time period of retention may vary depending on the temperature.

The method of heating the slurry is not critical, and may include indirect heating or direct heating by contacting the slurry with steam. However, since extremely high temperatures decrease the quality adversely, a heating method which tends to heat the slurry partially to an extremely high temperature is not preferred. Currently, the most satisfactory method of achieving this heat treatment is to pass the slurry through a device commonly known as a Jet Cooker. It includes adjacent jet nozzle orifices, normally concentric, through which the slurry and the pressurized steam used as a heating agent are ejected at high velocities in intersecting flow patterns, so that the slurry is instantly heated by the steam. The heated slurry is retained at about the same temperature in a holding chamber, usually an elongated tube, for a definite time period. The pressure on the slurry is then instantly released by discharging the slurry to a reduced pressure zone, into a suitable receiving means. This causes flash-off vaporization of a portion of the moisture in the form of water vapor which causes substantial and rapid cooling of the remaining slurry. However, the rapid cooling of the slurry is not critical to the solubility and other properties of the final product.

According to the process of this invention, not less than 75%, usually not less than 80% of the total nitrogen of the starting denatured defatted soybeans becomes water-soluble. In other words, the NSI of the treated soybeans becomes not less than 75%, usually not less than 80%. The extracted and isolated soy proteins are obtained in yields of about 60% and 30% respectively, by separating insoluble materials, and the whey, if necessary, from the treated slurry, followed by concentration, sterilizing and drying. The yields are greatly increased as compared with those achieved without the treatment of this invention, and are almost equal to those achieved by using undenatured defatted soybeans as starting materials. Furthermore, the process of this invention does not give any undesirable characteristics to the protein, and protein, and provides protein materials having excellent properties which cannot be obtained, or are superior to those obtained by using undenatured defatted soybean flakes as starting materials.

When the protein materials are produced from defatted soybean flakes denatured by superheating treatment in accordance with the method of this invention, they have almost the same gel-forming ability and emulsifying ability as those of protein materials produced from undenatured defatted soybean flakes. Furthermore, they have a higher solubility in water and sodium chloride solution, and are essentially free of the characteristic "beany" flavor of soybeans.

When the protein materials are produced from defatted soybean flake material denatured by alcohol extraction in accordance with the process of this invention, they have a higher solubility in both water and sodium chloride aqueous media, and a higher emulsifying ability. Moreover, they lack the characteristic "beany" flavor and the objectionable bitter taste of soybeans, and give a more brilliant and clearer white aqueous solution than the usual protein materials produced from undenatured defatted soybean flakes. Furthermore, the gel-forming ability and the foaming ability of the former materials are respectively about two and five times as strong as those of the latter, and the former materials make a more brilliant and clearer gel than the latter.

The resulting slurried product can be treated in the conventional manner, with the dried protein products having excellent properties. Alternatively, it can be used directly for food products as a material having excellent properties. For example, since the protein material of this invention has a high NSI and lacks "beany" flavor, it can be preferably used for the preparation of soy milk of high quality. The slurry of the material, preferably that obtained from defatted soybean flake material denatured by alcohol extraction, is mixed with edible oil such as palm oil, rice oil and rape oil at a weight ratio of protein to oil of between 1:0.7 and 1:2 and emulsified, preferably at an elevated pressure of more than 200 kg/cm$^2$, with or without prior separation of insoluble matter from the slurry. If the soy milk is prepared without separation of the insoluble matter, the above emulsification under an elevated pressure is effective and preferred for preparing a more homogeneous and stable emulsion.

The characteristic properties used in every Example have the following meanings:

NSI : Percent dissolved total nitrogen in water at 40° C.

NSI in 10% NaCl aqueous soln. : percent dissolved total nitrogen in 10% NaCl aqueous solution at 5° C.

Emulsifying Ability : percent formed emulsion by emulsifying a mixture of 50 g water, 50 g corn oil and 1.5 g sample at 15,000 rpm for 5 minutes, followed by centrifugation at 3,000 rpm for 10 minutes.

Emulsifying Ability in the presence of NaCl : Emulsifying Ability obtained by adding 2.5 g NaCl into the mixture to be emulsified in the above procedure.

Gel-Forming Ability : strength of gel obtained by heating a mixture of sample and water (protein content : 20%) at 90° C for 50 minutes.

Foaming Ability : Volume of foam obtained by stirring a 1% sample solution at 1,360 rpm for 10 minutes and allowing the resulting solution to stand for 10 minutes.

EXAMPLE 1

Defatted soybean flakes were desolventized in a desolventizer toaster to give denatured defatted soybean flakes having an NSI of 55%. 10 kg of the flakes were dispersed in 90 l of water at 50° C, and the resulting slurry was adjusted to pH 7.1 with sodium hydroxide. The material was then extracted for 30 minutes.

The resulting slurry was heated to 120° C with steam and retained at the same temperature for 2 minutes in a jet cooker. The insoluble materials therein were separated by decantation, and a sample of the resulting solution was taken out and analyzed. As a result, it was found that 82% of the total nitrogen of the starting flakes existed in the treated slurry in the water soluble form.

The resulting solution was spray dried to give 6.3 kg of extracted soy protein powder having a protein content of 62% (Yield 63%). The characteristics of the powder were as follows:
NSI : 83.5%
NSI in 10% NaCl aqueous soln. : 80.3%
Emulsifying Ability : 85%
Gel-Forming Ability : 328 g/cm$^2$

EXAMPLE 2

A slurry was prepared in the same manner as in Example 1, and adjusted to ph 8.0 with sodium hydroxide. The material was then extracted for 30 minutes.

The resulting slurry was heated to 110° C with steam and retained at the same temperature for 3 minutes in a jet cooker. The insoluble materials were separated by decantation, and a sample of the resulting solution was taken out and analyzed. As a result, it was found that 84% of the total nitrogen of the starting flakes existed in the treated slurry in the water soluble form.

The resulting solution was adjusted to pH 4.2 with sulfuric acid to precipitate the soy protein. The precipitate was separated from the whey and excess liquor by decantation. 26 kg of the precipitate was dispersed in 25 l of water and the resulting slurry was adjusted to pH 7.0 with sodium hydroxide. The resulting solution was mixed well by an emulsifier and spray-dried to give 3.2 kg of isolated soy protein powder having a protein content of 89.8% (Yield 32%). The characteristics of the powder were as follows:
NSI : 88%
Emulsifying Ability : 100%
Gel-Forming Ability : 356 g/cm²

EXAMPLE 3

10 Kg of undenatured defatted soybean flakes was suspended in 20 l of a mixture of ethanol and water (9:1, V/V), and kept at 50° C for 1 hour. The flakes were then desolventized to give 9.8 kg of bright yellow denatured defatted soybean flakes lacking the characteristic "beany" flavor of soybeans. The NSI of the flakes was 21%.

The flakes were suspended in water and then subjected to the heat treatment as in Example 2. The insoluble materials were separated from the treated slurry, and a sample of the resulting solution was taken out and analyzed. As a result, 78% of the total nitrogen of the starting flakes was found to exist in the treated slurry in the water soluble form.

The resulting solution was treated as in Example 2 to give 3.1 kg of bright yellow isolated soy protein powder lacking the beany flavor and the objectionable bitter taste (Yield 31%). The characteristics of the powder were as follows:
NSI : 83%
Emulsifying Ability : 100%
Gel-Forming Ability : 711 g/cm²

EXAMPLE 4

10 Kg of undenatured defatted soybean flakes was dispersed in 20 l of a mixture of ethanol and water (92:8, V/V), and kept at 25° C for 2 hours. The flakes was desolventized to give 9.5 kg of denatured defatted soybean flakes having an NSI of 42%. The flakes were ground, and suspended in water at a weight ratio of flakes to water of 1 to 10, and the resulting slurry was adjusted to pH 7.5 and allowed to stand for 30 minutes. The resulting slurry was treated at 130° C for 1 minute in a jet cooker as in the preceding Examples. A sample of the treated slurry was taken out and analyzed after the insoluble matter was separated out. As a result, 80% of the total nitrogen of the starting flakes was found to exist in the treated slurry in the water soluble form.

The treated slurry was adjusted to pH 7.0, and spray dried to give 8.5 kg of bright yellow soy protein powder. The characteristics of the powder were as follows:
NSI : 80%
Emulsifying Ability : 100%
Gel-Forming Ability : 685 g/cm²

EXAMPLE 5

1 kg of undenatured defatted soybean flakes was dispersed in 4 l of anhydrous ethanol and kept at room temperature for 2 hours. The flakes were filtered out, washed with fresh anhydrous ethanol, and desolventized in vacuo at 70° C. The NSI of the denatured soybean flakes obtained was 63%.

910 G of the denatured flakes was suspended in 10 l of water, and treated at 125° C for 2 minutes in a jet cooker as in the preceding Examples. The treated slurry was filtered and the resulting cake was washed with 2 l of water to give 11 l of the extraction solution (solids content 5.9%, protein content 3.5%). These figures showed that 91% of the total nitrogen of the starting flakes existed in the treated slurry in the water soluble form.

The extraction solution was adjusted to a protein content of 3%, and was mixed with palm oil so that the oil content became 4.2%. The mixture was then emulsified at 400 kg/cm². The resulting emulsion was mixed with sugar so that the sugar content became 1%, and sterilized at 125° C for 30 seconds.

The soy milk thus prepared was analyzed by a color and color difference meter, and the result showed the following characteristic values which are almost equal to those of cow's milk.

|  | Soy Milk | Cow's Milk |
| --- | --- | --- |
| L value | 88.5 % | 87.4 % |
| a value | −2.2 % | −2.4 % |
| b value | 6.3 % | 7.9 % |

The above values are indicia corresponding to the color of the material, using the three-dimensional Hunter "L. a. b." scale described in section 3.8.1.4 of ASTM D 2244–68.

Furthermore, when the taste and flavor of the soy milk were examined by 20 well-trained panels, only two panels stated that it had the characteristic beany flavor or the objectionable bitter taste.

EXAMPLE 6

10 Kg of undenatured defatted soybean flakes was dispersed in 20 l of 95% ethanol and the resulting slurry was allowed to stand at the boiling point (about 78° C) for 2 hours. The flakes were filtered out, washed with fresh 95% ethanol and dried to give 9.4 kg of denatured flakes having an NSI of 17%.

The denatured flakes were ground and dispersed in 94 l of water. The resulting slurry was adjusted to pH 7.5, and treated at 130° C for 2 minutes in a jet cooker as in the preceding Examples. The treated slurry was filtered to give 8.8 l of the extraction solution. The solution was adjusted to pH 7.0 and spray dried to yield 8.5 kg of extracted soy protein powder having a protein content of 63%. The characteristics of the powder were as follows:
NSI : 97%
NSI in 10% NaCl aqueous soln.: 95%
Emulsifying Ability in the presence of NaCl : 88%
Gel-Forming Ability : 1,750 g/cm²
Foaming Ability : 250 ml Hot cakes were prepared in accordance with the following formulas:

| Control | | | Hot Cake containing the extracted soy protein power | | |
|---|---|---|---|---|---|
| Wheat Flour | 200 | g | Wheat Flour | 180 | g |
| Baking Powder | 8 | g | Baking Powder | 8 | g |
| 1 Whole Egg | ca. 50 | g | 1 Whole Egg | ca. 50 | g |
| Butter | 10 | g | Butter | 10 | g |
| Sugar | 30 | g | Sugar | 30 | g |
| Syrup | 60 | g | Syrup | 60 | g |
| NaCl | 2 | g | NaCl | 2 | g |
| Milk | 180 | ml | Milk | 180 | ml |
| Water | 60 | ml | Water | 60 | ml |
| | | | The extracted soy protein powder | 20 | g |

The specific volumes of the hot cake containing the soy protein powder and the control were 2.8 ml/g and 2.3 ml/g, respectively.

The hot cake containing the soy protein powder tasted softer, was knifed more smoothly and lacked completely the characteristic "beany" flavor of soybeans.

What is claimed as new and intended to be secured by Letters Patent is:

1. A process for preparing soy protein material having improved solubility which comprises preparing an aqueous slurry of denatured defatted soybean flake material, wherein said aqueous slurry is adjusted to pH 6.5 to 9; heating said aqueous slurry to a temperature in the range of about 110° to 140° C; and subsequently retaining the heated slurry at a temperature in said range for from 2 seconds to 3 minutes; wherein the NSI of said denatured defatted soybean flake material is not more than 70%, and the NSI of the soy protein in the resultant heated and retained slurry is not less than 75%.

2. The process of claim 1, wherein said denatured defatted soybean flake material is obtained by subjecting defatted soybean flake material to superheating treatment or alcohol extraction.

3. The process of claim 2, wherein the weight ratio of said flake material to water in said aqueous slurry is between 1 to 5 and 1 to 15.

4. The process of claim 3, wherein said aqueous slurry prior to heating is permitted to stand for a period of time sufficient to extract water-soluble materials from said flake material.

5. The process of claim 1, which further comprises separating insoluble materials from said resultant heated and retained slurry to obtain a solution.

6. The process of claim 5, which further comprises drying said solution.

7. The process of claim 5, which further comprises adjusting said solution to the pH of about the isoelectric point of the protein to precipitate the protein;
separating said precipitated protein from the aqueous phase, dispersing said precipitated protein in water, and neutralizing the resultant mixture.

8. The process of claim 7, which further comprises drying said neutralized mixture.

9. The process of claim 1, which further comprises drying said heated and retained slurry.

10. The process of claim 1, which further comprises adjusting said heated and retained slurry to the pH of about the isoelectric point of the protein to precipitate the protein;
separating total solids after the precipitation step from the aqueous phase, dispersing said total solids in water, and neutralizing the resultant mixture.

11. The process of claim 10, which further comprises drying said neutralized mixture.

* * * * *